United States Patent [19]

Lange et al.

[11] 4,266,260

[45] May 5, 1981

[54] SURGE ARRESTER

[75] Inventors: Gerhard Lange; Juergen Boy, both of Berlin, Fed. Rep. of Germany

[73] Assignee: Siemens Aktiengesellschaft, Berlin & Munich, Fed. Rep. of Germany

[21] Appl. No.: 48,606

[22] Filed: Jun. 14, 1979

[30] Foreign Application Priority Data

Jun. 29, 1978 [DE] Fed. Rep. of Germany ....... 2828650

[51] Int. Cl.[3] ............................................ H02H 9/06

[52] U.S. Cl. ........................................ 361/120; 361/129

[58] Field of Search ............... 361/117, 119, 120, 129; 313/355

[56] References Cited

U.S. PATENT DOCUMENTS

| | | | |
|---|---|---|---|
| 3,454,811 | 7/1969 | Scudner . | |
| 3,676,743 | 7/1972 | Bahr et al. . | |
| 3,691,428 | 9/1972 | Bahr et al. | 361/120 |
| 3,780,350 | 12/1973 | Sanger et al. | 361/120 X |
| 3,876,894 | 4/1975 | Peche . | |
| 3,989,973 | 11/1976 | Lange et al. | 361/120 X |
| 4,015,172 | 3/1977 | Peche et al. | 361/129 |

*Primary Examiner*—Harry E. Moose, Jr.

*Attorney, Agent, or Firm*—Hill, Van Santen, Steadman, Chiara & Simpson

[57] ABSTRACT

A surge arrester has a gas-filled housing, in which, by means of a tubular insulating body, copper electrodes are positioned opposite one another in a spaced relation, and have a stepped, truncated conical shape. The electrodes, in the region of the active surfaces thereof, are designed with thicker walls than the conical sides in the region of the connection to the insulating body. The surge arrester is characterized in the case of small dimensions by good alternating current loading, surge current loading and life-span characteristics, combined with low response surge voltage and high extinguishing potential. The active surfaces of the copper electrodes are provided with a deep waffeling or honeycombing, or concentric rings, in which an electrode activating substance is anchored, the substance comprising aluminum powder and magnesium oxide. The surge arrester is particularly suitable for protecting communication lines.

12 Claims, 5 Drawing Figures

SURGE ARRESTER

BACKGROUND OF THE INVENTION

1. Field of the Invention

The present invention relates to a surge arrester having a gas-filled housing in which, by means of a tubular insulating body, copper electrodes are spaced opposite one another and have a stepped, truncated conical shape, which electrodes, in the region of the active surfaces thereof, are designed with walls thicker than on the conical sides in the region of the connection to the insulating body.

2. Description of the Prior Art

Evacuated tubeless surge arresters having truncated, conically-shaped electrodes are known in the art (German published application No. 1,951,015) which, in the area of the active surfaces, are designed with walls which are thicker than the conical sidewalls in the area of transition to the tubular insulating body. It is also known per se, that the electrodes in the area of the active surfaces can have a flat waffeling for the application of an activating substance. However, one is not apprised from this art as to the nature of the activating substance. The electrodes consist of a Ni-Fe-Co alloy, on the exterior side of which electrical leads are attached.

In addition, surge arresters having evacuated tubes are known, in which the massive electrodes consist of copper, such as in U.S. Pat. No. 3,454,811. In the case of surge arresters of this type, no waffeling is provided for anchoring an activating layer on the active electrode surfaces. A special solution even provides the application of a carbon layer upon the electrodes in order to avoid erosion and the production of cavities upon the active surfaces of the electrodes under discharge conditions of the arrester.

Gas discharge surge arresters should be efficient and long-lived. Therefore, in increasing measures a value is placed, in addition to the alternating and surge current loading capacity, upon higher actuator or switch life-span characteristics. Switch life-span tests are conducted with pulse-shaped surge currents, opposed to the usual surge current tests, for example 10 kA wave 10/50 μs, display lesser current intensities and longer times, for example, 500 A wave 10/1000 μs. The average attainable number of circuits by which the surge arresters do not lose their ability to function, is evaluated, that is, the response DC current and the installation may not change above prescribed values.

The sum of necessary electrical characteristics is primarily determined by the size of the electrodes, the material, the electrode activating substance, the type of gas and the gas pressure. The electrode materials used in known gas discharge surge arresters are predominantly iron-nickel-cobalt alloys, which, in respect of the coefficient of expansion, are accommodated to the ceramic of the insulating body. Copper leads of a component can be reproducibly securely attached to such electrodes. For the protection of signaling lines, surge arresters which are designed as air discharge devices having carbon electrodes 10, because of their slight electrode spacings of approximately 0.05 mm, toward fine connections.

SUMMARY OF THE INVENTION

The object of the present invention, therefore, is to provide a gas-filled surge arrester having small dimensions and which is characterized by good alternating current and surge current loading and life-span features, combined with low response surge voltage and a high extinguishing voltage.

According to the present invention, in the case of a surge arrester of the type mentioned above, it is provided that the active surfaces of the copper electrodes include a deep waffeling or concentric rings in which an electrode activating substance of aluminum powder and magnesium oxide is anchored.

The aluminum powder and the magnesium oxide of the electrode activating substance advantageously have a grain size of between 1-50 μm. The depth of the waffeling or of the concentric rings amounts, advantageously, to approximately 0.25 mm. Such deep anchorings of the activating layer provide the electrode surface with a dispenser cathode feature and are possible practically only in the case of copper as the electrode material.

According to an advantageous construction of a surge arrester in accordance with the principles of the present invention, the copper electrodes have electrical leads on the exterior surfaces which face away from the active surfaces. For individual uses, the required leads are formed out together with the electrodes, and, as massive cylinders, at the same time increase the loading capacity. In order to guarantee the high surge current carrying capacity of the surge arrester constructed in accordance with the present invention, it is advantageous to select electrical leads to be made of copper. With a resistance welding technique, however, copper leads cannot be welded onto copper electrodes with sufficient security. It can therefore be practical to manufacture the copper electrodes in an extrusion process, whereby the copper electrodes display, as a bonding material in the welding zone, a plate of readily weldable material, for example iron, nickel, or an iron-nickel-cobalt alloy.

According to a further advantageous construction of a surge arrester in accordance with the present invention, the copper electrodes are manufactured in accordance with powder metallurgy techniques as a bonding structure and contain a readily weldable material, for example iron or nickel, in the area of the welding zone.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
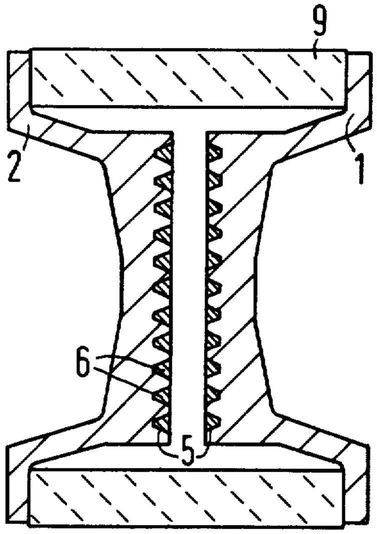
FIG. 1 is a sectional view of a surge arrester constructed in accordance with the present invention.

Referring to the surge arrester of FIG. 1, a gas-filled housing is provided which is preferably filled with an inert gas. The housing includes a tubular insulating body 9, for example, a ceramic, which supports a pair of copper electrodes 1 and 2 which are positioned opposite one another and which are spaced apart. Each of the electrodes has a stepped and truncated conical shape, and in the region of the active surfaces are designed with walls which are thicker than the conical sidewalls in the area of the transition and connection to the insulating body 9. Upon the active surface of each of the copper electrodes 1 and 2, a deep waffeling, honeycombing or a plurality of concentric rings is provided, in which an electrode activating substance 6 is anchored, the substance being aluminum powder and magnesium oxide.

Figure 2:
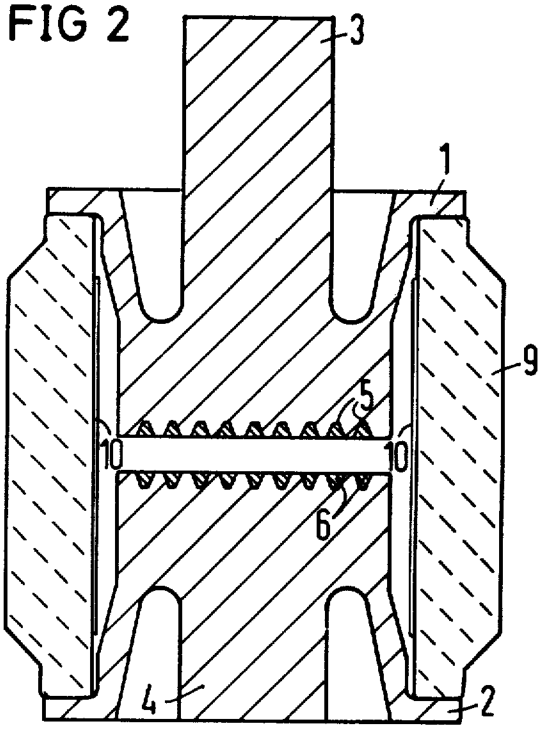
FIG. 2 is a sectional view of another surge arrester constructed in accordance with the present invention.

The surge arrester illustrated in FIG. 2 comprises a tubular insulating body 9 which has a pair of copper electrodes 1 and 2 which are connected in a gas-tight manner to the insulating body 9 and which are designed in the shape of truncated cones. Preferably, inert gas serves as the gas filling; however, also nitrogen can be used. In this preferred embodiment of the invention, the copper electrodes 1 and 2 are formed out of respective single pieces of copper integral with and including respective electrical leads 3 and 4. Also, the sidewalls of the copper electrodes 1 and 2 are designed much thinner than the bottoms of the electrodes 1 and 2 and have a gradation so that an elastic transition area is created between the electrodes 1 and 2 and the tubular insulating body 9. The active surfaces of the electrodes 1 and 2 are provided with a deep waffeling, honeycombing or concentric rings which anchor an electrode activating substance 6 of aluminum powder and magnesium oxide.

By means of a waffle, honeycombing or ring depth, recessed spaces of approximately 0.25 mm are created which guarantee a particularly good bonding of the activating substance. For further reduction of the response surge voltage of the surge arrester, it is practical to apply one or more strips of electrically conductive material upon the inner wall of the insulating body 9, for example graphite ignition strips 10. In this embodiment of the invention, the insulating body 9 has a step, over which the exterior sides of the copper electrodes 1 and 2 do not project, so that in the case of a possible insulation of the surge arrester into a metal tube holder, an insulating path, rather than a conductive path, is formed between the electrodes and the metal tube holder.

Figure 3:
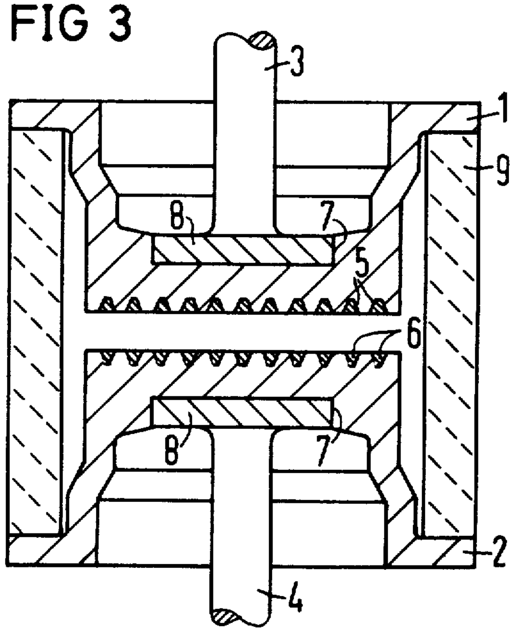
FIG. 3 is a sectional view of a third embodiment of a surge arrester constructed in accordance with the present invention.

The surge arrester illustrated in FIG. 3 has a pair of stepped, truncated cone-shaped copper electrodes 1 and 2 which are secured in a gas-tight manner into the ends of a tubular insulating body 9, which in this embodiment consists of ceramic material. The gas-tight connection is realized with a solder layer or a glass sealant. The active surfaces of the electrodes 1 and 2 are provided with a deep recessing 5, such as waffeling, honeycombing or concentric rings, in which the electrode activating substance 6 is anchored. The copper electrodes are preferably manufactured in an extrusion or embossing process and on the bottom are designed with walls that are thicker than the conical sidewalls. On the exterior of the bottom of the electrodes 1 and 2, a bonding is provided in a welding zone 7 between the exterior surfaces of the copper electrodes 1 and 2 and respective leads 3 and 4, which consist of copper, by the provision of a plate 8 of readily solderable material, for example, or iron, nickel or a nickel-iron-cobalt alloy.

Figure 4:
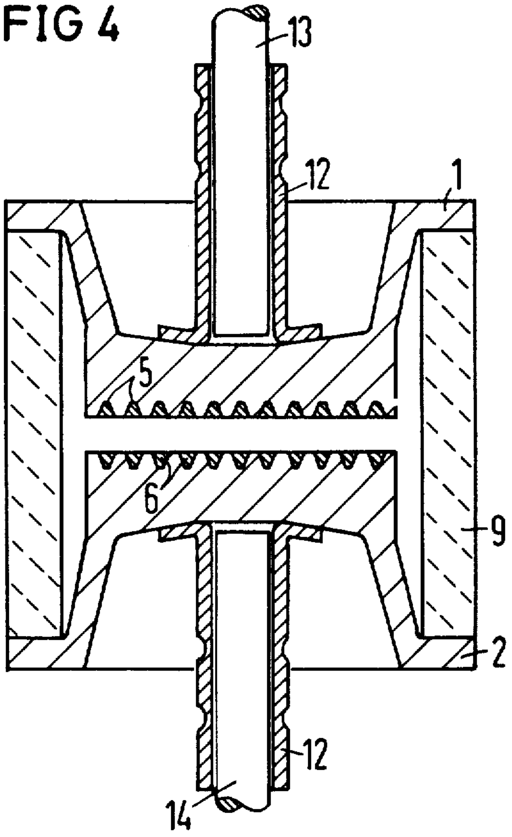
FIG. 4 is a sectional view of a surge arrester of the type generally illustrated in FIG. 1 and including crimped leads.

Referring to FIG. 4, a pair of electrodes 1 and 2, in the shape of a truncated cone, and made of copper, are secured in opposite ends of an insulating body 9 in a gas-tight manner. The electrodes carry an activating layer 6 anchored in deep recesses, such as waffeling, honeycombing or concentric rings, on the active surfaces thereof. On the exterior sides, which face away from the active surfaces, a tubular rivet 12 is secured, such as by soldering. The tubular rivet 12 preferably consists of copper.The tubular rivet 12, on each side, receives a respective lead 13, 14 and is crimped thereto.

Figure 5:
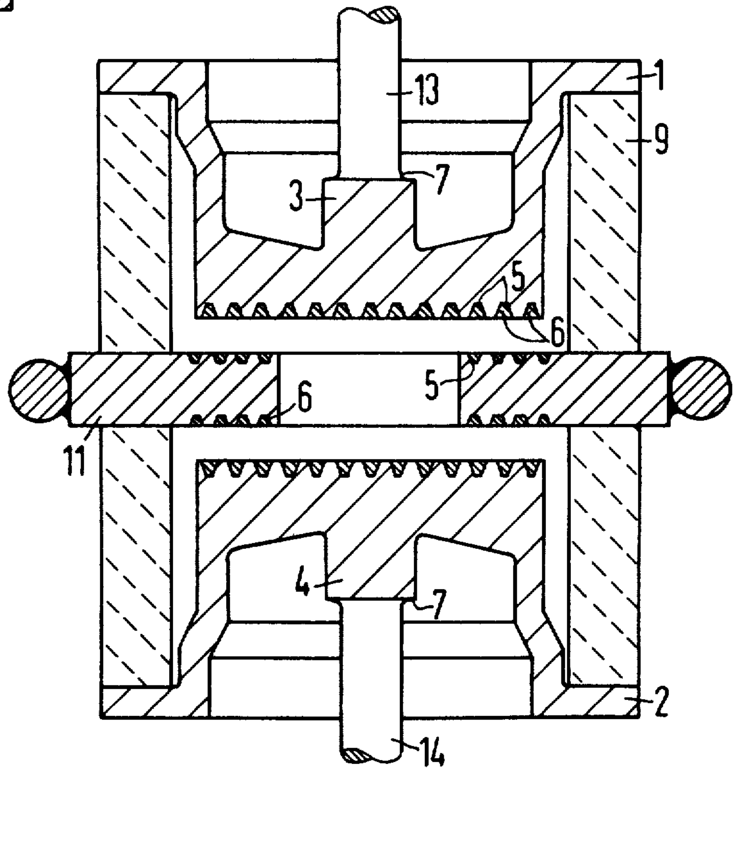
FIG. 5 is another embodiment of the surge arrester constructed in accordance with the present invention and having a double discharge path.

In FIG. 5, a surge arrester is illustrated in the form of a double path arrester. An insulating body 9 is provided which is subdivided in the central portion thereof by means of a copper ring electrode 11 which, with the truncated conically shaped copper electrodes 1 and 2, forms two discharge paths. As with the two electrodes 1 and 2, the central copper ring electrode 11 is provided upon its active surfaces, with a deep recessing, such as waffeling, honeycombing or concentric rings, in which the electrode activating substance of aluminum powder and magnesium oxide is secured (5, 6). The copper electrodes 1 and 2 each have, on their exterior surfaces which face away from the active surface, respective electrical leads 3 and 4 in the form of a pressed cylinder, the dimensions of which are thicker than the leads of a component 13, 14 which are to be soldered thereto. By means of this design, the heat transfer during soldering is reduced. The cylinder is, in particular, approximately 1.5 times as thick as the respective lead to be soldered thereto. This construction of the electrodes is not limited to a double path arrester, but can also be used to advantage in the case of a single path arresters.

The solid binding of the electrical leads 3, 4 with the leads of a component 13, 14 can also be realized by providing that the copper electrodes 1 and 2 are manufactured in a powder metallurgical technique and at the level of the solder zone 7 contain a readily solderable material, preferably iron or nickel.

Although we have described our invention by reference to particular illustrated embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim

1. In a surge arrester of the type in which a first electrode and a second electrode are sealed gas-tight in opposite ends of a tubular gas-filled insulating body, in which each electrode has a stepped truncate conical shape with an end wall with an end surface spaced from the like end surface of the end wall of the other electrode and the end wall having a thickness greater than that of the side wall, the improvement therein comprising:

recess means defining recesses in the end surface; and an activating substance in the recesses comprising aluminum powder and magnesium oxide.

2. The improved arrester of claim 1, wherein:

said activtaing substance has a grain size in the range of between 1 and 50 μm.

3. The improved arrester of claim 1, wherein:

said recess means defines recesses having a depth of approximately 0.25 mm.

4. The improved arrester of claim 1, of the type in which each electrode has an outer surface on the end wall, the improvement further defined as comprising:

a pair of electical leads each of which extends from a respective outer surface.

5. The improved arrester of claim 4 wherein:

each electrode and the respective lead are an integral one-piece structure.

6. The improved arrester of claim 4, wherein:

each of said end walls includes in the area of the outer surface a readily solderable material selected from the group of iron, nickel or an iron-nickel-cobalt alloy.

7. The improved arrester of claim 4, wherein the thick end wall of each of the electrodes comprises:

a powdered metal structure including an easily solderable portion in the zone of the outer surface.

8. The improved arrester of claim 4, wherein electrical leads are to be connected to the outer surfaces, and wherein:

the end walls include integral, and as a one-piece structure therewith, a compressed cylindrical member for connection to the respective electrical lead.

9. The improved arrester of claim 4, comprising:

on each of the outer surfaces, a hollow rivit for receiving an electrical lead, said rivit being crimpable for attachment to the lead.

10. The improved arrester of claim 9, wherein each of the rivits comprises copper.

11. The improved arrester of claim 9, wherein the arrester further comprises:

a copper ring electrode mounted between the two end surfaces of the end walls of the electrodes to provide two discharge paths.

12. The improved arrester of claim 11, wherein:

the ring electrode includes first and second surfaces each facing respective surfaces of the first-mentioned electrodes; and comprising second recess means defining other recesses in said first and second surfaces of the ring electrode; and said activating substance in said recesses in in said first and second surfaces.

* * * * *